Feb. 18, 1964 W. O. REED 3,121,796

INDEPENDENTLY PULSED FEEDBACK PATH FOR IMAGE TRANSDUCING SYSTEMS

Original Filed May 6, 1955

INVENTOR
William O. Reed

BY Hugh H. Drake
ATTORNEY

United States Patent Office 3,121,796

Patented Feb. 18, 1964

3,121,796

INDEPENDENTLY PULSED FEEDBACK PATH FOR IMAGE TRANSDUCING SYSTEMS

William Oliver Reed, Wellesley, Mass., assignor to The Rauland Corporation, a corporation of Illinois Continuation of application Ser. No. 841,836, Sept. 23, 1959, which is a division of application Ser. No. 506,646, May 6, 1955. This application June 25, 1962, Ser. No. 206,132

6 Claims. (Cl. 250—213)

Figure 1:
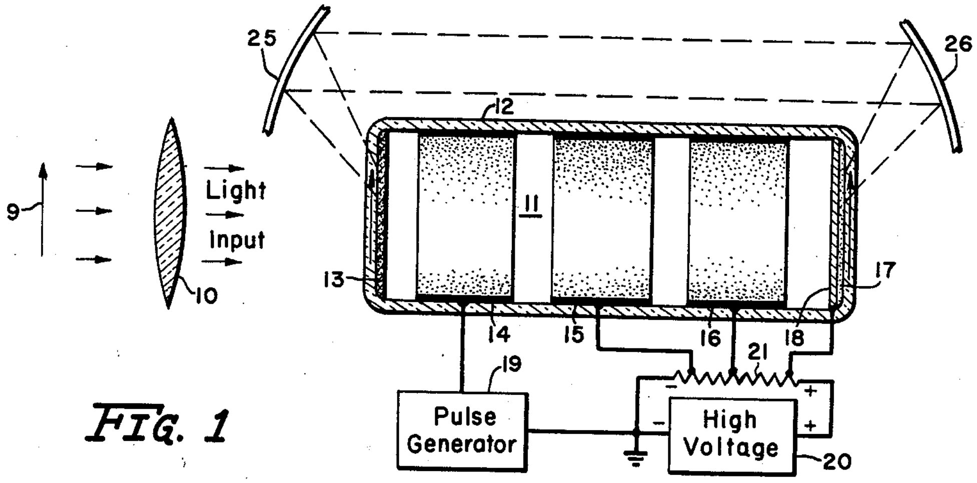

This invention relates to image transducing systems and more particularly to such systems employing regenerative optical feedback systems. This application is a continuation of the copending application by the same inventor, Serial No. 841,836, filed September 23, 1959, which in turn is a division of the then copending application by the same inventor, Serial No. 506,646, filed May 6, 1955, now abandoned, all assigned to the same assignee.

It is often necessary or desirable to improve the brightness and definition of an image beyond the degree possible or practical in conventional devices. To this end, some known structures direct an electron stream from a photoemissive cathode illuminated by a primary image to a fluorescent screen on which a secondary image is formed; such devices are well known in the art. It is also known to employ optical feedback systems comprising a system of lenses, whereby the secondary image developed by such a system is optically coupled back to the input of the transducer in exact coincidence, or registration, with the image formed by the incoming light. It is readily apparent that such a system builds up a very high gain, indeed operates as a regenerative amplifier. It has been found that such an amplifier can and does become saturated because of absence of control over the amount of the regenerative feedback; such a system does not reproduce half tones.

It is, therefore, an object of the invention to provide an optical image transducer which simultaneously achieves very high gain and faithfully renders an intensified secondary image corresponding to the primary image, including half tones.

In accordance with the invention, a regenerative image transducer comprises a photosensitive element upon which a primary image may be formed, and a luminescent screen. The invention further includes means for energizing the transducer to develop a secondary image on the luminescent screen. The invention also includes an optical feedback system for directing light from the secondary image to impinge upon the photosensitive element in registration with the primary image, and means for only intermittently completing the optical feedback loop.

Figure 2:
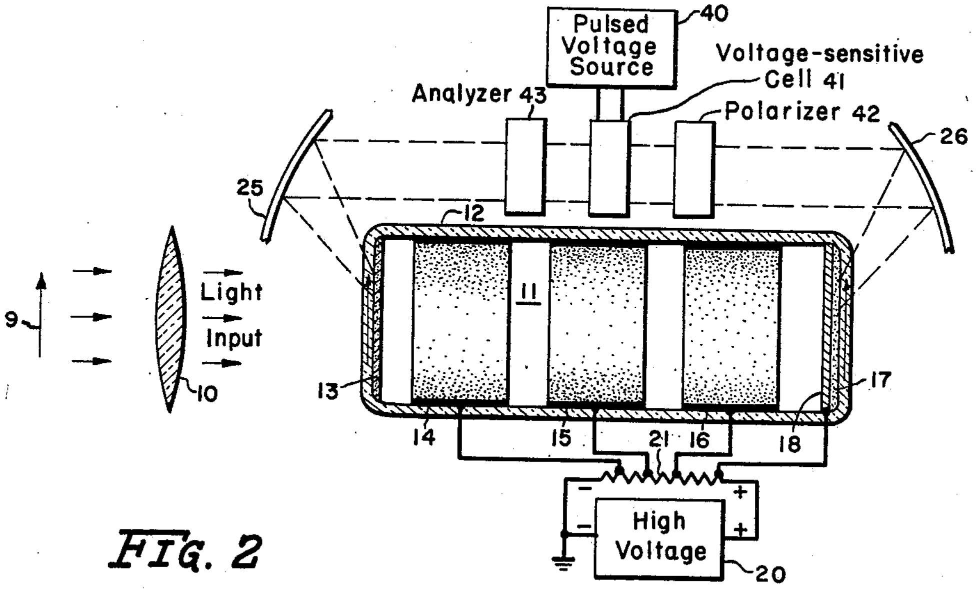

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a side view, partly in section and partly schematic, of an embodiment of the invention; and FIGURE 2 is a side view, partly in section and partly schematic, of another embodiment of the invention.

FIGURE 1 portrays an embodiment of the invention in which an optical system, represented schematically by a single lens 10, is positioned to pass light waves from an object to be imaged, shown schematically as an upright arrow 9, to a photoemissive cathode 13 of an image transducer 11. Transducer 11 is coaxially aligned with lens system 10, and comprises a cylindrical glass envelope 12. Adjacent the surface of transducer 11 nearest lens 10, photoemissive cathode 13, which may be of conventional construction comprising a layer of antimony-cesium (Sb-Cs) or silver cesium (Ag-O-Cs), is affixed. Three accelerating electrodes 14, 15, and 16 are disposed between photoemissive cathode 13 and a fluorescent screen 17; the accelerating electrodes may be formed as conductive coatings of colloidal graphite or the like on the inner wall of envelope 12, or as cylindrical metal rings supported within envelope 12 in a conventional manner. On the faceplate surface of transducer 11 a fluorescent screen 17 is affixed, and a metal backing layer 18, such as an aluminum film, is deposited on fluorescent screen 17.

A pulse generator 19 has one terminal connected to accelerating electrode 14, and the other terminal connected to ground. Accelerating electrodes 15 and 16, and aluminum backing film 18, are connected to appropriate D.C. or unidirectional operating potentials, represented schematically by connections to different taps on a potentiometer 21 connected in parallel with a battery or other high voltage source 20.

An optical reflecting system comprising a pair of matched hemispherical mirrors 25 and 26 is associated with transducer 11 so that light from the secondary image formed by fluorescent screen 17 is reflected back to photocathode 13, and impinges on photocathode 13 in registration with the incoming light waves representing the primary image of object 9. Only a small portion of mirrors 25 and 26, which may be of conventional Schmidt-type hemispherical construction having a small central aperture for viewing, are shown.

In operation radiation from object 9 passes through lens system 10 and strikes photoemissive cathode 13, forming a primary image of object 9 thereon. The incident radiation from object 9 excites the photoemissive material, which emits electrons in proportion to the intensity of the incident light waves and forms, in the aggregate, an electronic reproduction or replica of the primary image created by light waves impinging on photoemissive cathode 13; all half-tones present in the optical intelligence are reproduced in the electron stream. If accelerating electrodes 14–16 are maintained at progressively higher positive potentials with respect to photoemissive cathode 13, the electron stream is progressively accelerated by electrodes 14, 15, and 16, and further accelerated by aluminum film 18 to impinge on fluorescent screen 17. By way of illustration and in no sense by way of limitation, a D.C. potential of 1,000 volts may be applied to electrode 15, a D.C. potential of 250 volts to electrode 14, of 5,000 volts to electrode 16, and a D.C. potential of 12,000 volts to aluminum backing film 18. The electron stream impinging on fluorescent screen 17 excites the phosphor material to produce an intensified secondary image corresponding to the primary image impressed on photoemissive cathode 13. The secondary image formed at fluorescent screen 17 is reflected by mirrors 25 and 26 to impinge on photoemissive cathode 13 in exact coincidence, or registration, with the primary image from lens system 10. A feedback loop is thereby created which includes a forward-going internal portion and an external feedback portion. The same cycle recurs continuously, providing regenerative feedback and producing a very high gain in the system, to the extent that saturation of the fluorescent screen ensues and the half-tone components of the reproduced image are completely lost.

In accordance with the invention, pulse generator 19 produces a rectangular wave energizing voltage for application to accelerating electrode 14. The rectangular wave may be 500 volts peak-to-peak, or 250 volts in each direction from a zero reference axis. Alternatively, an asymmetrical wave having a positive excursion of 250 volts and swinging only 100 volts in a negative direction may be employed, since a negative 100 volts is ample to interrupt electron flow; such a wave form lessens the power requirements for pulse generator 19. The length of the positive voltage pulse may be 0.1 microsecond, with an interval of 0.9 microsecond between positive voltage pulses.

As the positive voltage is applied to accelerating electrode 14, the electron stream is directed from photoemissive cathode 13 to fluorescent screen 17; when the negative voltage is applied to accelerating electrode 14, the electron stream is cut off. Thus, although regeneration and consequent high gain are obtained during the "on" period of the tube, the "off" periods provided by pulse generator 19 prevent the system from reaching a saturated state. Such "cycling" obviates saturation and enables the reproduction of half-tones appearing at the input of the system. By applying such a rectangular wave energizing voltage to electrode 14, the electron flow to fluorescent screen 17 is periodically interrupted, and the advantages of regenerative optical feedback are obtained without loss of half tones in the secondary image. Because the transducer is only intermittently energized, a condition of controlled or limited regeneration is achieved, and a substantial increase in gain is obtained without saturation of fluorescent screen 17. In a preferred embodiment, fluorescent screen 17 is formed of fast decay phosphors, such as zinc-oxide or cerium activated calcium-magnesium silicate, which exhibit a decay time of the same order of magnitude as the periodicity of the applied pulsating voltage from generator 19. The use of such phosphors provides good resolution of input intelligence of the frequency ranges now employed in commercially broadcast television signals. Of course, the pulsed control-signals need not be periodic or regular in recurrence, so long as the regenerative feedback is effectively interrupted at a sufficiently high rate to prevent saturation.

Excellent results have been obtained while employing a transducer embodying an antimony-cesium photoemissive cathode and a fluorescent screen comprising zinc-oxide phosphors, while applying a 1-megacycle rectangular-wave energizing potential having a 10 percent duty cycle to accelerating electrode 14.

The embodiment of the invention shown in FIGURE 2 is similar to that shown in FIGURE 1, except that pulse generator 19 of FIGURE 1 is omitted and a pulsed voltage source 40, a voltage-sensitive cell 41, a polarizer 42, and an analyzer 43 are provided in the optical feedback path. Accelerating electrode 14 may be maintained at a constant D.C. potential of 500 volts; the potentials applied to the remaining elements may be the same as those applied in the embodiment shown in FIGURE 1. Polarizer 42, voltage-sensitive cell 41, and analyzer 43 (FIGURE 2) are positioned in the optical feedback path so that light waves reflected from mirror 26 to mirror 25 must pass through these three elements, in the order last named. Polarizer 42 is constructed to polarize incident light in a certain plane, and analyzer 43 is constructed and arranged to pass light polarized in a plane rotated 90° from that of polarizer 42. Voltage-sensitive cell 41, which may be a conventional Kerr cell, may contain a transparent liquid which is normally isotropic but which becomes anisotropic upon the application of a suitable voltage. The liquid of voltage-sensitive cell 41, in the anisotropic state, has an index of refraction such that the plane of polarization of at least some of the light emerging from polarizer 42 is rotated by 90°, insuring that all such light will pass analyzer 43. In the isotropic state, the liquid of voltage-sensitive cell 41 causes no such shift in polarization; therefore the light waves incident on analyzer 43 are substantially identical in polarization to the light waves emerging from polarizer 42, and analyzer 43 rejects such light waves. A suitable pulsed voltage source 40 is coupled to the plates of voltage-sensitive cell 41 to periodically interrupt the optical feedback from fluorescent screen 17 to photocathode 13. The construction and operation of Kerr cell 41, together with the polarizer, analyzer, and voltage source, are shown and described, for example, in "Television," by Zworykin and Morton, published by John Wiley & Sons, Inc., 1940, pp. 245–251.

In this embodiment of the invention, the transducer itself is constantly energized and the fed-back light from the secondary image is periodically interrupted by coupling suitable voltages to voltage-sensitive cell 41; this periodic interruption prevents the system from building up to saturation of the fluorescent screen and insures the faithful reproduction of half-tone input intelligence. In the embodiment of FIGURE 1, the regenerative feedback from the fluorescent screen to the photocathode is uninterrupted, but the photoelectron flow within the transducer itself is interrupted from time to time by the pulsed control signals from generator 19. In both embodiments, therefore, the regenerative feedback is effectively interrupted to prevent saturation and provide half-tone reproduction.

The embodiments of the invention enable a weak image to be intensified without loss of contrast and shadings that appear in the original image. The regenerative feedback employed in the invention affords a very high gain, so that relatively weak impulses may be clearly and brightly reproduced. By periodically energizing the transducer or by periodically interrupting the regenerative feedback, the regeneration is controlled, and the possibility of saturating the system is obviated. This insures faithful reproduction of half-tones in the output of the transducer.

While particular embodiments of the invention have been shown and described, it is apparent that modifications and alterations may be made, and it is intended in the appended claims to cover all such modifications and alterations as may fall within the true spirit and scope of the invention.

I claim:

1. A regenerative image transducing system comprising: a transducer having a photo-emissive cathode upon which a primary image may be formed, a luminescent screen of a phosphor having a predetermined decay time, an electrode system energizable to direct electrons to impinge upon said screen and develop thereon a secondary image, and electron control means cooperative with said electrode system to develop said image and responsive to control signals for interrupting the electron flow from said cathode to said screen through said electrode system; an optical feedback system external to said transducer for directing light from said secondary image to impinge upon said photoemissive cathode in registration with said primary image, said optical feedback system together with said transducer constituting a regenerative feedback loop; means for continuously energizing said electrode system to develop said secondary image on said luminescent screen in response to impingement of said electrons thereon; a source of pulse control signals having duty cycle such that the off-time of said control signals is less then said decay time; and means co-acting with said transducing system independently of said energizing means for applying said control signals to said electron control means to alternately enable and interrupt said regenerative feedback loop.

2. A regenerative image transducing system comprising: a transducer having a photo-sensitive element upon which a primary image may be formed, a luminescent screen, and means for energizing said transducer to develop a secondary image on said luminescent screen; an optical system external to said transducer for directing light from said secondary image to impinge upon said photo-sensitive element in registration with said primary image, said optical system together with said transducer constituting a regenerative feedback loop; and means external to said transducer and co-acting with said transducing system independently of said energizing means for periodically disabling said optical system to repeatedly interrupt said regenerative feedback loop.

3. A regenerative image transducing system comprising a transducer having a photo-sensitive element upon which a primary image may be formed, a luminescent screen, and means for continually energizing said transducer to develop a secondary image on said luminescent screen in response to electrons impinging thereon; an optical system external to said transducer for directing light from said secondary image to impinge upon said photo-sensitive element in registration with said primary image, said optical system together with said transducer constituting a regenerative feedback loop; and means co-acting with said transducing system independently of said energizing means for alternately enabling and interrupting said regenerative feedback loop.

4. A regenerative image transducing system comprising: a transducer having a photo-sensitive cathode upon which a primary image may be formed, a luminescent screen of a phosphor having a predetermined light-output decay time, and means for continuously energizing said transducer to develop a secondary image on said luminescent screen in response to electrons from said cathode impinging thereon; and optical system external to said transducer for directing light from said secondary image to impinge upon said photo-sensitive element in registration with said primary image, said optical system together wth said transducer constituting a regenerative feedback loop; and means co-acting with said transducing system independently of said energizing means for alternately enabling and interrupting said regenerative feedback loop by interrupting the flow of electrons from said cathode to said screen with a duty cycle such that the off-time of said electron flow is less than said decay time.

5. A regenerative image transducing system comprising a transducer having a photo-sensitive element upon which a primary image may be formed, a luminescent screen, and means for energizing said transducer to develop a secondary image on said luminescent screen; an optical system external to said transducer for directing light from said secondary image to impinge upon said photo-sensitive element in registration with said primary image, said optical system together with said transducer constituting a regenerative feedback loop; and means in said optical system for repeatedly interrupting passage of said light in said feedback loop.

6. A regenerative image transducing system comprising: a transducer having a photo-sensitive element upon which a primary image is formed and a luminescent screen of a phosphor having a predetermined light-output decay time, the transducing system including a path for directing light from said secondary image to impinge upon said photo-sensitive element in registration with said primary image and said path together with said transducer constituting a regenerative feed back loop; means for energizing the transducer to develop the secondary image on said luminescent screen in response to the presence of the primary image; and means having a coaction with said transducing system additional to that of said energizing means for alternately enabling and interrupting said regenerative feed back at a rate having a time duration of interruption less than said predetermined decay time.

No references cited.

Disclaimer 3,121,796.—*William Oliver Reed*, Wellesley, Mass. INDEPENDENTLY PULSED FEEDBACK PATH FOR IMAGE TRANSDUCING SYSTEMS. Patent dated Feb. 18, 1964. Disclaimer filed Apr. 20, 1964, by the assignee, *The Rauland Corporation.*

Hereby enters this disclaimer to claim 3 of said patent.

[*Official Gazette July 21, 1964.*]